(12) United States Patent
Gignac et al.

(10) Patent No.: US 7,918,204 B2
(45) Date of Patent: Apr. 5, 2011

(54) MOUNTING BRACKET

(75) Inventors: Simon G. Gignac, Amherstburg (CA); Brian V. Jean, Windsor (CA); Todd E. Lemieux, Oxford, MI (US); Ian J. Phillips, Windsor (CA); Aranka Poliak, Tecumseh (CA)

(73) Assignee: TI Group Automotive Systems, L.L.C., Warren, MI (US)

( * ) Notice: Subject to any disclaimer, the term of this patent is extended or adjusted under 35 U.S.C. 154(b) by 740 days.

(21) Appl. No.: 11/869,005

(22) Filed: Oct. 9, 2007

(65) Prior Publication Data

US 2008/0087245 A1    Apr. 17, 2008

Related U.S. Application Data

(60) Provisional application No. 60/829,133, filed on Oct. 11, 2006.

(51) Int. Cl.
F02B 67/00 (2006.01)
(52) U.S. Cl. .............. 123/195 A; 123/196 S; 248/316.7; 248/316.5; 248/312; 248/313; 248/671; 210/232
(58) Field of Classification Search .............. 123/195 A; 248/316.7, 316.5, 312, 313, 674; 210/232; 417/360, 363
See application file for complete search history.

(56) References Cited

U.S. PATENT DOCUMENTS

| | | | | |
|---|---|---|---|---|
| 2,209,477 | A * | 7/1940 | Reibel | 248/606 |
| 3,516,627 | A * | 6/1970 | Gable et al. | 248/560 |
| 4,441,684 | A * | 4/1984 | Credle, Jr. | 248/674 |
| 4,832,306 | A * | 5/1989 | Bossack | 248/674 |
| 5,211,547 | A | 5/1993 | Gaston et al. | |
| 6,412,733 | B1 | 7/2002 | Grzemski | |
| 6,729,598 | B2 * | 5/2004 | Folliot et al. | 248/671 |
| 2003/0102033 | A1 | 6/2003 | Dasilva et al. | |

FOREIGN PATENT DOCUMENTS

| | | |
|---|---|---|
| CN | 1353409 | 6/2002 |
| DE | 4228155 | 12/1993 |
| GB | 1403714 | 8/1975 |

OTHER PUBLICATIONS

Chinese First Office Action of Feb. 12, 2010.
Chinese Second Office Action of Sep. 30, 2010.
EP Extended Search Report Jan. 11, 2001.

* cited by examiner

*Primary Examiner* — Michael Cuff
*Assistant Examiner* — Hung Q Nguyen
(74) *Attorney, Agent, or Firm* — Reising Ethington P.C.

(57) ABSTRACT

In one implementation, a bracket includes a body having a first connection feature and a second connection feature each adapted to retain a separate portion of a component. The first connection feature is rotationally misaligned relative to the second connection feature so that a portion of the component is received in a first direction in the first opening and then the component is moved in a second direction to receive another portion in the second opening. In one form, the connection features include openings that are arranged such that one portion of the component is first slidably received in the first opening, and then the component is rotated generally about the portion received in the first opening so that another portion of the component can be received in the second opening.

10 Claims, 2 Drawing Sheets

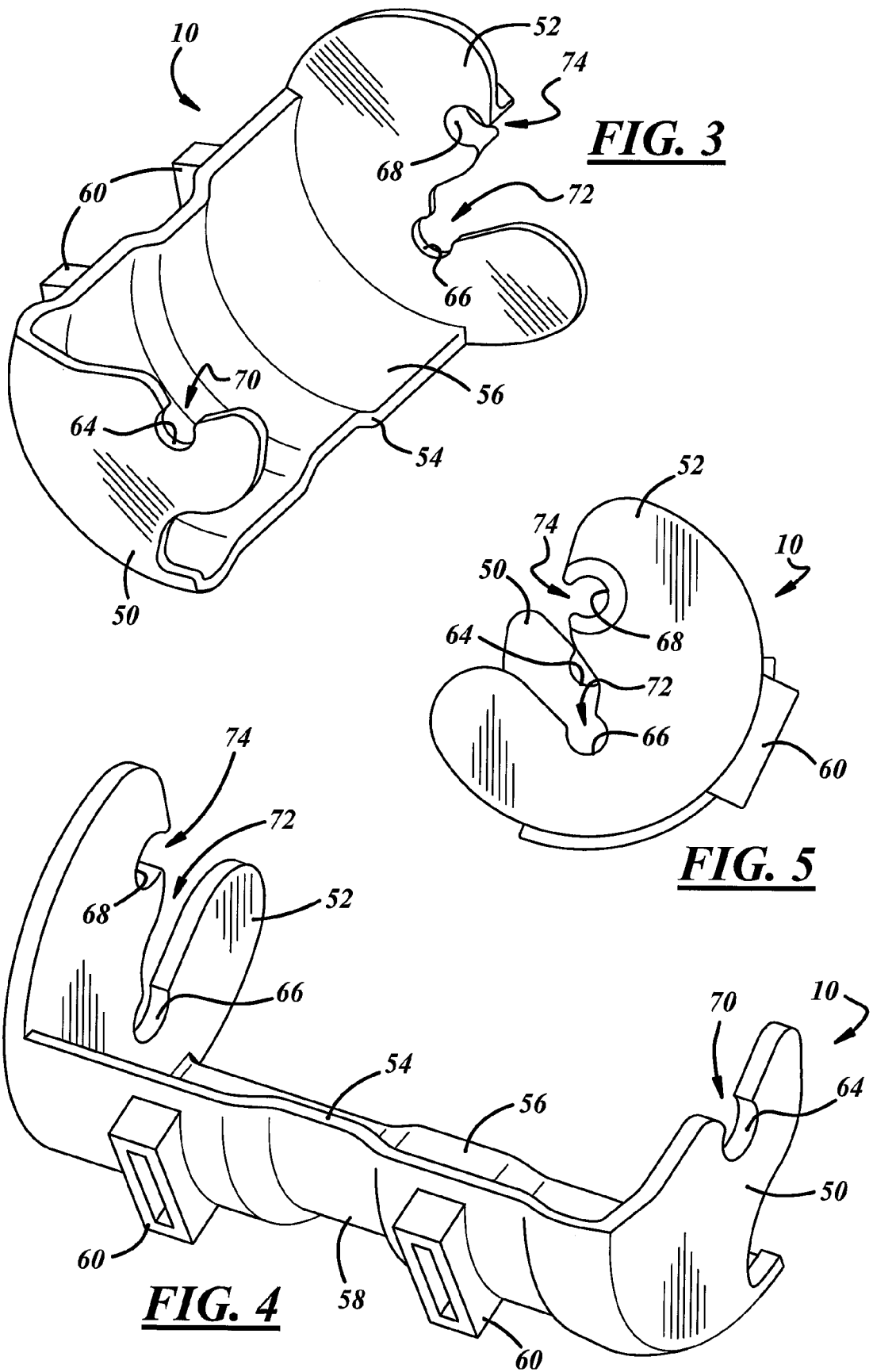

MOUNTING BRACKET

REFERENCE TO COPENDING APPLICATION

This application claims the benefit of U.S. Provisional Patent Application Ser. No. 60/829,133, filed on Oct. 11, 2006, which is incorporated herein by reference in its entirety.

FIELD OF THE INVENTION

The present invention relates generally to a bracket, and more particularly to a bracket that may be used to mount or retain a component, such as a fuel system component.

BACKGROUND OF THE INVENTION

Automotive fuel system components are mounted in various locations throughout the vehicle. For example, fuel pumps and other components may be mounted in a fuel tank, fuel lines may be routed around, and clipped or otherwise connected to the fuel tank, and inline components may be mounted to the fuel tank or elsewhere in the vehicle. Currently, some fuel system components are connected to the fuel tank or elsewhere in the vehicle by an assembly that includes a bracket, a strap, and a screw and or a bolt to tighten the strap about the bracket and retain the fuel system component on the bracket.

SUMMARY OF THE INVENTION

In one implementation, a bracket includes a body having a first connection feature and a second connection feature each adapted to retain a separate portion of a component. The first connection feature is rotationally misaligned relative to the second connection feature so that a portion of the component is received in a first direction in the first opening and then the component is moved in a second direction to receive another portion in the second opening.

In one form, the connection features include openings that are arranged such that one portion of the component is first slidably received in the first opening, and then the component is rotated generally about the portion received in the first opening so that another portion of the component can be received in the second opening. In an embodiment where the bracket has three openings, two of the openings may be generally aligned to receive respective portions of the component at or generally at the same time or in the same general direction of movement. The component can then be rotated generally about the portions already received in the two openings until a third portion of the component is received in the third opening. In at least some embodiments, the portions received in the openings may include fluid conduits that extend outwardly of the openings and are connected with fluid lines to permit fluid flow through the component carried by the bracket.

BRIEF DESCRIPTION OF THE DRAWINGS

The following detailed description of presently preferred embodiments and best mode will be set forth with regard to the accompanying drawings in which:

FIG. 3 is a perspective view showing a front portion of the bracket;

FIG. 4 is a perspective view showing a rear portion of the bracket; and

FIG. 5 is an end view of the bracket.

DETAILED DESCRIPTION OF PREFERRED EMBODIMENTS

Figure 1:
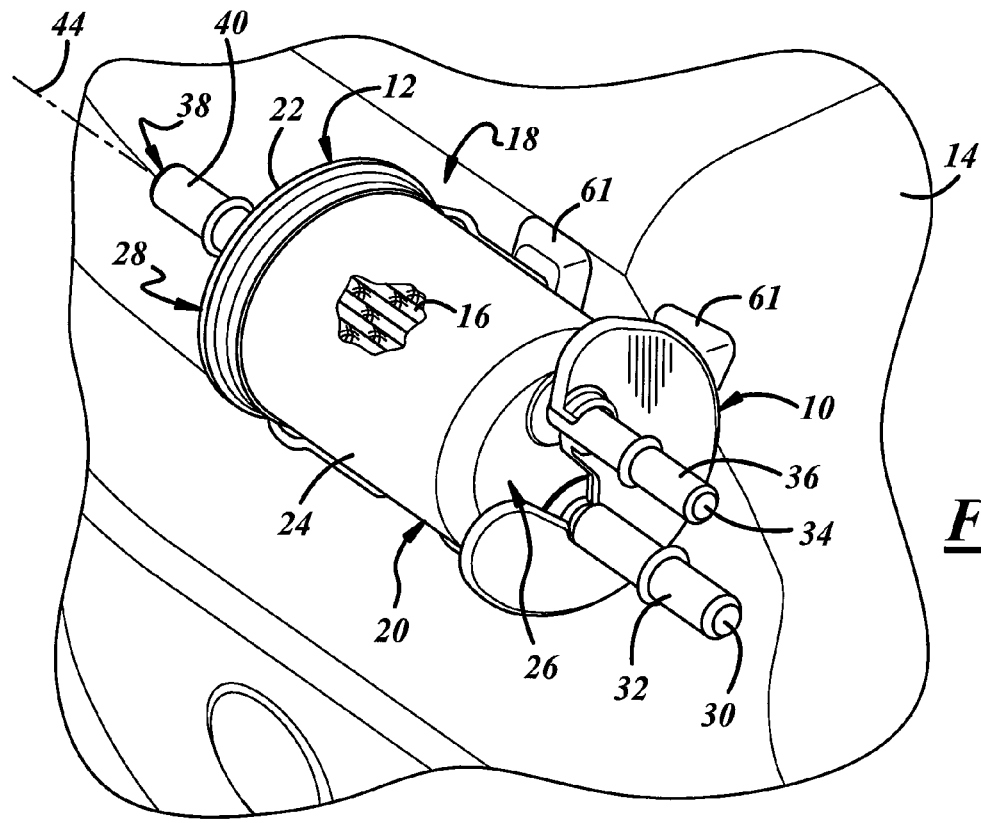
FIG. 1 is a perspective view with a portion broken away of one embodiment of a bracket carried by a fuel tank and supporting a fuel system component therein.
Figure 2:
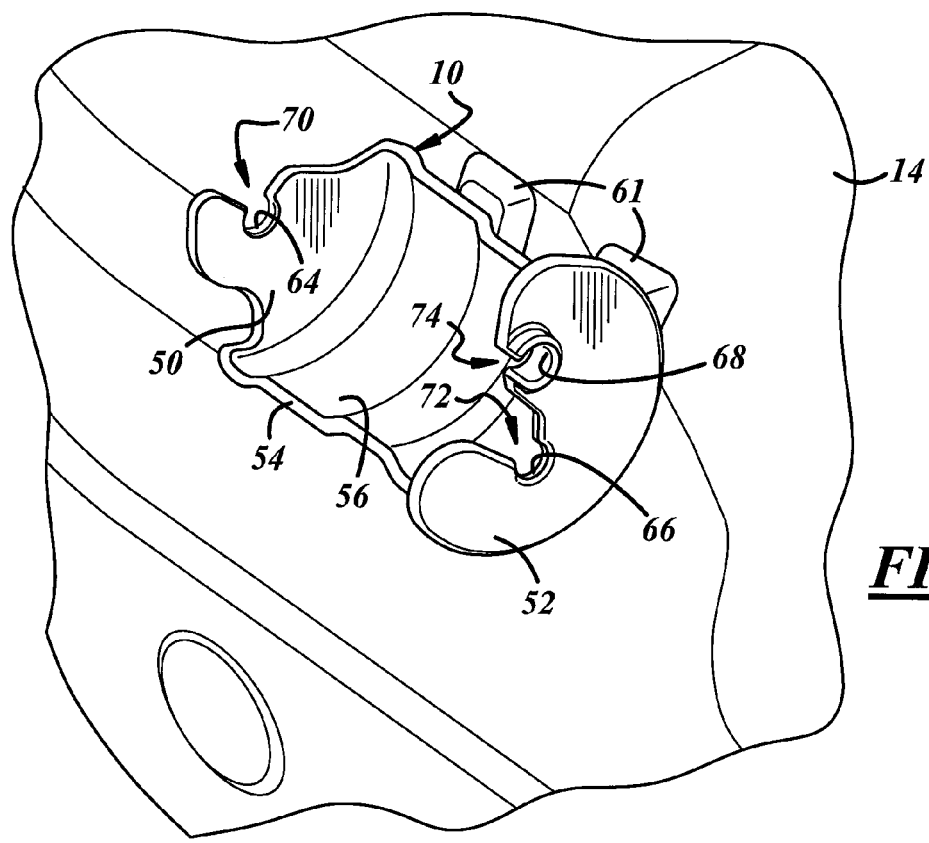
FIG. 2 is a perspective view like FIG. 1 with the fuel system component removed from the bracket.

Referring in more detail to the drawings, FIGS. 1-5 illustrate a bracket 10 for a fuel system component 12. The bracket 10 may be used to connect the fuel system component 12 to, for example, a fuel tank 14, such as shown in FIGS. 1 and 2. In the implementation shown, the bracket 10 holds a fuel filter 16 adjacent to the fuel tank. The fuel filter 16 is disposed inline between a fuel pump and a fuel rail that feeds fuel to the fuel injectors of a combustion engine.

As shown in FIG. 1, the fuel system component, such as the fuel filter 16, may include a housing 18 with a main body 20 and a lid 22 connected to the body. The main body 20 may have a generally cylindrical sidewall 24 which is generally closed at one end 26 and is open at its other end 28 until application of the lid 22 thereto to define an interior of the housing. The fuel filter 16 may be disposed in the interior of the housing to filter fuel discharge from a fuel pump and prior to it being delivered to an engine. An inlet passage 30 communicates with the interior of the housing and may be defined by an inlet nipple or first conduit 32 formed in one piece with the body 20 and adapted to receive or otherwise be connected to a fuel line. A return fuel outlet passage 34 may be defined by a return fuel nipple or third conduit 36 extending from the end 26 and communicates with the interior of the housing 18. The return fuel conduit 36 is also adapted to receive or communicate with a fuel line to permit fluid flow from the interior of the housing 18 to the fuel tank 14.

In assembly, the lid 22 closes the open end 28 of the body 20 and is preferably fastened or fixed thereto to enclose and retain the fuel filter within the interior and provide a fluid tight seal between the lid 22 and body 20. The lid 22 preferably includes a fuel outlet passage 38 that may be defined in a second or fuel outlet conduit 40 extending from the lid 22, adapted to receive or be connected to a fuel line, and communicating the interior of the housing 18 with the fuel line for the delivery of fuel to the engine. In the implementation shown, the fuel outlet conduit 40 is coaxially aligned with the body 20 and lid 22, although other orientations and locations can be employed. The fuel inlet conduit 32 and return fuel conduit 36 are radially offset from the axis 44 of the outlet conduit 40 and the body 20, although one of them could be coaxially arranged with the body.

The bracket 10 may include a pair of generally spaced apart endwalls 50,52 interconnected by a sidewall 54. The endwalls 50,52 may be parallel, and may overlap a portion, all of, or more than all of the ends 26,28 of the housing 18, as desired. To securely receive the housing 18 therein, the endwalls 50,52 may be spaced apart a distance generally equal to the length of the housing 18. The sidewall 54 may have a configuration generally complementary to the housing. In the implementation shown, the sidewall 54 has a generally concave inner surface 56 that surrounds a portion of the circumference of the housing 18, and a corresponding generally convex outer surface 58. Connection features 60 are disposed or carried by the outer surface to facilitate connecting the bracket 10 to another component, such as the fuel tank 14 as shown in FIG. 1. In this implementation, the connection features 60 include one or more weld pads or feet that extend outwardly from the sidewall 54 and in assembly, are welded to the fuel tank 14 such as to mounts or weld pads 61 formed on the tank, if desired. Of course, the bracket 10 may be connected to a support or some other component in any suitable way including by an adhesive, mechanical fastener, or any welding method, by way of examples without limitation.

At least two component connection features are carried by the bracket 10 and are adapted to maintain the fuel system component 12 therein. The connection features may include at least one opening formed in each endwall 50,52, with each opening adapted to receive a corresponding one of the conduits 32,36,40 extending from the housing 18. In the implementation shown, one opening 64 is provided in one end wall 50 and two openings 66,68 are provided in the other end wall 52. To facilitate receipt of the conduits 32,36,40 in the openings 66,68, and 64, respectively, each opening includes an entrance portion or slot 70,72,74 respectively, extending to its opening 64,66,68. Each slot 70,72,74 preferably has a minimum width that is less than the major diameter of its associated opening and the outside diameter of the conduits 32,36, 40 so that the conduits are snap fit through the slots and into the openings to securely retain them. In at least one implementation of the bracket 10 and component 12, each conduit 32,36,40 may extend generally perpendicular to its associated end wall 50, 52, and all three conduits may be generally parallel to each other.

The first and second openings 64,66 include entrance portions or slots 70,72 that are generally rotationally or circumferentially aligned so that the outlet conduit 40 may be pressed into the first opening 64 and the inlet conduit 32 may be pressed into the second opening 66 generally at the same time or at least in the same general orientation of the housing 18 (e.g. without significant manipulation or rotation of the housing). The third opening 68 includes a slot 74 that is rotationally or circumferentially misaligned from the slots 70,72 of the first and second openings 64,66. The third opening 68 is also radially offset from the second opening 66 and is generally radially aligned with the return fuel conduit 36 (after conduits 32, 40 have been received in their respective openings) such that upon sufficient rotation of the housing 18, the return fuel conduit 36 is snap fit received into the third opening 68.

With the entrance portion of the third opening 68 rotationally or circumferentially offset or misaligned relative to the entrance portion 72 of the second opening 66, forces tending to remove the inlet conduit 32 from the second opening 66 (and hence, the outlet conduit 40 from the first opening 64) are resisted by engagement of the return fuel conduit 36 with the end wall 52. Likewise, forces acting on the housing 18 laterally, in a direction tending to laterally move the return fuel conduit 36 out of the third opening 68 are resisted by engagement of the other conduits 32,40 with the bracket 10. In this manner, the housing 18 can be removed from the bracket 10 as shown in this implementation by rotating the housing 18 in the opposite direction in which it was rotated to install the return fuel conduit 36 into the third opening 68, thereby first rotatably removing the return fuel conduit 36 from the third opening 68. Thereafter, the inlet and outlet conduits 32,40 can be snapped or forced out of the first and second openings 64,66 to permit service, repair or replacement of the housing 18, and/or the fuel filter therein.

As best shown in FIG. 5, the first and second openings 64,66 do not have to be coaxially aligned. Clearance can be provided in one or both of the first or second openings 64,66 to permit some lateral or eccentric movement of the corresponding fuel conduit 32,40 as the housing 18 is rotated to install the return fuel conduit 36 into the third opening 68. Also, clearance can be provided between the sidewall 24 of the housing 18 and the sidewall 54 of the bracket 10 to permit the rotation needed during installation. Further, the bracket 10 may be formed of a polymer material having some flexibility, such as injection molded HDPE, to permit the eccentric or off-center rotation of at least one of the inlet conduit 32 and outlet conduit 40 during installation.

In at least some applications, it may be desirable to permit the bracket 10 to separate from the fuel tank 14, preferably without serious damage to the fuel tank 14. This may occur, for example, during a vehicle accident or other event that imparts onto the bracket 10 a force above a threshold force. This may prevent or inhibit damage to or a breach of the fuel tank 14. This may be accomplished by forming the weld pads 60 (or other connection features) so they are frangible or adapted to break or separate from the bracket 10 when acted upon by force above a threshold. As an alternative, the connection between the bracket 10 and the fuel tank 14 can be controlled so that the separation occurs along the point or points of attachment between the bracket 10 and fuel tank 14. Or, the fuel tank could be designed to have a portion, to which the bracket 10 is mounted (such as pads 61), break away under a threshold force, or a combination of these and/or other provisions could be used.

Accordingly, the bracket 10 securely retains a fuel system component 12, such as an inline fuel filter, in an assembly that is relatively easy to manufacture and install. Desirably, in the implementation shown, the fuel filter is retained without the need for a strap, band, screws, bolts and the like. This facilitates installation, repair, service or replacement of the fuel filter which can be installed and removed without any tools (in at least some implementations) and quickly. In this manner there may be a great reduction in the time to install the fuel filter 12, and a reduction in the number parts and cost of the bracket 10 as a whole.

The disclosure of presently preferred embodiments set forth herein is in terms of description and not limitation. Those of ordinary skill in this art will readily recognize that other embodiments can be made, as well as various modifications to the embodiments disclosed, all of which may fall within the spirit and broad scope of this invention. By way of example without limitation, the bracket could be used with other vehicle components, for example a non-fuel system related component or a fuel vapor canister. Such canisters may have a vapor inlet, an air inlet, and a vapor purge outlet, for example. And the bracket may be used with only two connection features to securely retain a component therein, and such connection features do not have to be disposed at the end walls of the bracket or a housing of the component carried by the bracket. Such features could be disposed anywhere along the bracket and component housing, including along, in, on or extending from a sidewall, as examples without limitation. Of course, other substitutions or modifications may be employed, as contemplated by the scope of the appended claims.

The invention claimed is:

1. A bracket for mounting and removably retaining a component having a first projecting portion, a second projecting portion generally axially spaced from the first portion and a third projecting portion generally radially spaced from the second portion and generally axially spaced from the first portion, and the first portion generally radially spaced from at least one of the second and third portions, the bracket comprising:

a body having spaced-apart first and second walls with a first opening in the first wall constructed to receive the first portion of the component and having a first slot extending generally radially from the first opening and through the first wall, the first slot having a minimum width less than a diameter of the first opening and constructed so that the first portion of the component snap fits through the first slot and into the first opening to retain the first portion of the component;

a second opening in the second wall constructed to receive the second portion of the component and having a second slot extending generally radially from the second opening and through the second wall, the second slot having a minimum width less than a diameter of the second opening and constructed so that the second portion of the component snap fits through the second slot and into the second opening to retain the second portion of the component therein;

a third opening in the second wall separate from and radially spaced from the second opening and constructed to receive the third portion of the component therein and having a third slot separate from the first and second slots and the first and second openings and extending generally radially from the third opening through the second wall, the third slot having a minimum width less than a diameter of the third opening and constructed so that the third portion of the component snap fits through the third slot and into the third opening to retain the third component therein; and the first opening is radially offset from at least one of the second or third openings, and the second slot is circumferentially offset from the third slot.

2. The bracket of claim 1 wherein the third slot of the third opening is generally aligned with the first slot of the first opening so that lateral movement of the component will dispose the first and third portions in the first and third openings respectively prior to generally rotary movement of the component to dispose the second portion in the second opening.

3. The bracket of claim 1 wherein the first and third openings are not coaxially aligned and clearance is provided between at least one of the openings and its corresponding portion of the component to permit generally rotary movement of the fuel system component.

4. The bracket of claim 1 wherein at least two of the projecting portions of the component each include a fuel passage through which fuel will flow.

5. The bracket of claim 1 which also comprises at least one connection feature constructed to be connected to a fuel tank to mount the bracket and the component received therein on the fuel tank.

6. The bracket of claim 5 wherein the connection feature has at least one foot constructed to be connected to the fuel tank and permitting the bracket to break away from the fuel tank when the bracket is acted upon by a force above a threshold level.

7. The bracket of claim 5 wherein the connection feature is a weld pad constructed to be welded to the fuel tank.

8. The bracket of claim 1 wherein the first slot is circumferentially misaligned relative to the second slot so that the first and second portions of the component cannot be inserted at the same time into the respective first and second openings of the bracket.

9. The bracket of claim 1 wherein the first and third slots and first and third openings are constructed so that the component is moved generally laterally to snap fit the first and third components into the first and third openings respectively and thereafter the component is rotated to snap fit the second portion into the second opening.

10. The bracket of claim 1 wherein the first and third openings are generally axially aligned so that the first and third portions of the component can be inserted into the first and third openings of the bracket at generally the same time and in the same generally lateral direction of movement of the component relative to the bracket.

* * * * *